(12) United States Patent
Marupaduga

(10) Patent No.: US 10,237,759 B1
(45) Date of Patent: Mar. 19, 2019

(54) COORDINATED MULTIPOINT SET SELECTION BASED ON DONOR STATUS

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/473,375

(22) Filed: Mar. 29, 2017

(51) Int. Cl.
*H04L 5/00* (2006.01)
*H04W 24/02* (2009.01)
*H04W 24/10* (2009.01)
*H04W 88/02* (2009.01)
*H04W 88/08* (2009.01)

(52) U.S. Cl.
CPC ........... *H04W 24/02* (2013.01); *H04L 5/0035* (2013.01); *H04W 24/10* (2013.01); *H04W 88/02* (2013.01); *H04W 88/08* (2013.01)

(58) Field of Classification Search
CPC .... H04B 7/024; H04B 7/0413; H04B 7/0617; H04B 7/15507; H04B 7/15557; H04B 7/2606; H04L 5/0032; H04L 5/0035; H04W 24/02; H04W 24/10; H04W 72/0426; H04W 88/02; H04W 88/08
See application file for complete search history.

(56) References Cited

U.S. PATENT DOCUMENTS

| 7,248,841 | B2 * | 7/2007 | Agee ................... | H04B 7/0417 455/101 |
| 7,760,702 | B2 * | 7/2010 | Deng ................. | H04B 7/15592 370/351 |
| 8,121,052 | B2 * | 2/2012 | Zheng .................. | H04W 92/02 370/254 |
| 8,565,688 | B2 * | 10/2013 | Li ........................ | H04L 1/0029 455/67.11 |
| 8,599,740 | B2 | 12/2013 | Cai et al. | |
| 8,670,716 | B2 * | 3/2014 | Yu ..................... | H04W 72/1231 370/315 |

(Continued)

FOREIGN PATENT DOCUMENTS

| CN | 102036325 B | * | 6/2013 | .......... H04W 76/021 |
| EP | 2385653 | | 11/2011 | |

(Continued)

OTHER PUBLICATIONS

Kang et al., Method and apparatus for discovering a relay node, WO 2014183617 A1, English Translation Google Patents (Year: 2014).*

(Continued)

*Primary Examiner* — Eric Nowlin

(57) ABSTRACT

Disclosed herein are methods and systems that can help to more effectively select a cooperating set of cells for coordinated multipoint (CoMP) service. One illustrative method involves: (a) determining a donor status of a first base station that serves a first cell, wherein the donor status indicates whether or not the first base station is configured as a donor base station for at least one relay node, and (b) based at least in part on the determined donor status of the first base station, determining whether or not to include the first cell in a CoMP cooperating set.

20 Claims, 7 Drawing Sheets

(56) References Cited

U.S. PATENT DOCUMENTS

| | | | | |
|---|---|---|---|---|
| 8,738,001 | B2* | 5/2014 | Fahldieck | H04W 36/32 455/438 |
| 8,743,829 | B2* | 6/2014 | Guan | H04W 76/11 370/331 |
| 8,831,612 | B2* | 9/2014 | Kim | H04W 36/38 455/411 |
| 8,837,320 | B2* | 9/2014 | Cili | H04W 24/08 370/252 |
| 9,071,997 | B2* | 6/2015 | Cili | H04W 24/08 |
| 9,125,074 | B2* | 9/2015 | Wang | H04W 24/02 |
| 9,143,222 | B2* | 9/2015 | Miyata | H04W 16/26 |
| 9,143,972 | B2* | 9/2015 | Tao | H04B 7/024 |
| 9,173,152 | B2* | 10/2015 | Kim | H04W 36/38 |
| 9,198,059 | B2* | 11/2015 | Miyata | H04B 7/024 |
| 9,271,249 | B2* | 2/2016 | Davydov | H04W 76/27 |
| 9,337,970 | B2* | 5/2016 | Hammarwall | H04L 1/0026 |
| 9,344,918 | B2* | 5/2016 | Yamazaki | H04B 7/024 |
| 9,345,028 | B1 | 5/2016 | Pawar et al. | |
| 9,397,864 | B2* | 7/2016 | Cili | H04W 24/02 |
| 9,413,435 | B1 | 8/2016 | Oroskar et al. | |
| 9,420,501 | B2* | 8/2016 | Lei | H04W 36/38 |
| 9,432,221 | B2* | 8/2016 | Cili | H04W 24/08 |
| 9,462,557 | B2* | 10/2016 | Anto | H04W 52/08 |
| 9,485,725 | B2* | 11/2016 | Yaacoub | H04W 52/0206 |
| 9,554,375 | B1 | 1/2017 | Srinivas et al. | |
| 9,629,144 | B1 | 4/2017 | Ramamurthy et al. | |
| 9,674,809 | B1 | 6/2017 | Ramamurthy et al. | |
| 9,693,304 | B2* | 6/2017 | Davydov | H04W 52/04 |
| 9,820,273 | B2* | 11/2017 | Zhang | H04W 72/0426 |
| 9,820,289 | B1 | 11/2017 | Pawar et al. | |
| 9,961,582 | B2* | 5/2018 | Hammarwall | H04L 1/0026 |
| 9,967,881 | B1 | 5/2018 | Sevindik | |
| 2003/0161328 | A1 | 8/2003 | Chase et al. | |
| 2004/0095907 | A1* | 5/2004 | Agee | H04B 7/0417 370/334 |
| 2008/0253319 | A1 | 10/2008 | Ji et al. | |
| 2009/0075587 | A1* | 3/2009 | Yu | H04W 72/1231 455/7 |
| 2010/0054137 | A1* | 3/2010 | Deng | H04B 7/15592 370/247 |
| 2011/0294509 | A1* | 12/2011 | Kim | H04W 36/24 455/436 |
| 2012/0057535 | A1* | 3/2012 | Zhang | H04W 72/04 370/329 |
| 2012/0088455 | A1 | 4/2012 | Love et al. | |
| 2012/0113950 | A1* | 5/2012 | Skov | H04L 5/0016 370/329 |
| 2012/0182972 | A1* | 7/2012 | Guan | H04W 76/11 370/331 |
| 2012/0213146 | A1* | 8/2012 | Liu | H04J 11/0053 370/312 |
| 2012/0225680 | A1* | 9/2012 | Suh | H04W 16/32 455/501 |
| 2012/0252462 | A1* | 10/2012 | Fahldieck | H04W 36/32 455/438 |
| 2012/0282942 | A1 | 11/2012 | Uusitalo et al. | |
| 2012/0329401 | A1 | 12/2012 | Wegmann et al. | |
| 2013/0017825 | A1* | 1/2013 | Li | H04L 1/0029 455/425 |
| 2013/0021925 | A1* | 1/2013 | Yin | H04B 7/024 370/252 |
| 2013/0083783 | A1 | 4/2013 | Gupta et al. | |
| 2013/0114517 | A1 | 5/2013 | Blankenship et al. | |
| 2013/0244709 | A1* | 9/2013 | Davydov | H04W 72/0413 455/501 |
| 2013/0288731 | A1 | 10/2013 | Chu | |
| 2013/0322273 | A1* | 12/2013 | Etemad | H04W 24/10 370/252 |
| 2013/0343273 | A1 | 12/2013 | Barbieri et al. | |
| 2013/0343317 | A1* | 12/2013 | Etemad | H04B 7/024 370/329 |
| 2014/0022924 | A1* | 1/2014 | Cili | H04W 24/08 370/252 |
| 2014/0022925 | A1* | 1/2014 | Cili | H04W 24/08 370/252 |
| 2014/0056237 | A1 | 2/2014 | Eriksson et al. | |
| 2014/0099900 | A1* | 4/2014 | Cili | H04W 24/02 455/67.11 |
| 2014/0112173 | A1* | 4/2014 | Hammarwall | H04L 1/0026 370/252 |
| 2014/0185523 | A1* | 7/2014 | Davydov | H04W 76/27 370/328 |
| 2014/0219152 | A1* | 8/2014 | Anto | H04W 52/08 370/311 |
| 2014/0226575 | A1* | 8/2014 | Davydov | H04W 52/04 370/329 |
| 2014/0274197 | A1* | 9/2014 | Miyata | H04B 7/024 455/524 |
| 2014/0293803 | A1* | 10/2014 | Wang | H04W 24/02 370/252 |
| 2014/0370902 | A1* | 12/2014 | Kim | H04W 36/24 455/438 |
| 2015/0009931 | A1* | 1/2015 | Yamazaki | H04B 7/024 370/329 |
| 2015/0011158 | A1 | 1/2015 | Luo et al. | |
| 2015/0031369 | A1* | 1/2015 | Gunnarsson | H04W 36/04 455/438 |
| 2015/0049626 | A1 | 2/2015 | Chen et al. | |
| 2015/0141015 | A1* | 5/2015 | Zhang | H04W 36/0061 455/436 |
| 2015/0195032 | A1* | 7/2015 | Sharma | H04B 7/15557 370/315 |
| 2015/0270877 | A1 | 9/2015 | Hessler et al. | |
| 2015/0304132 | A1* | 10/2015 | Cili | H04W 24/08 370/329 |
| 2015/0312811 | A1* | 10/2015 | Lei | H04W 36/0055 370/331 |
| 2015/0341149 | A1 | 11/2015 | Chatterjee et al. | |
| 2015/0382290 | A1* | 12/2015 | Yaacoub | H04W 52/0206 370/311 |
| 2016/0157156 | A1* | 6/2016 | Chen | H04W 36/28 370/331 |
| 2016/0174111 | A1* | 6/2016 | Zhu | H04W 36/0033 370/331 |
| 2016/0227430 | A1* | 8/2016 | Hammarwall | H04L 1/0026 |
| 2017/0048763 | A1* | 2/2017 | Ke | H04W 36/0066 |
| 2017/0048913 | A1* | 2/2017 | Teyeb | H04W 48/18 |
| 2017/0134996 | A1* | 5/2017 | Wang | H04W 12/04 |
| 2017/0272219 | A1 | 9/2017 | Park et al. | |
| 2018/0062708 | A1* | 3/2018 | Sun | H04B 7/024 |
| 2018/0070276 | A1* | 3/2018 | Wu | H04W 36/14 |
| 2018/0084464 | A1* | 3/2018 | Ozturk | H04W 76/25 |
| 2018/0220321 | A1* | 8/2018 | Hammarwall | H04L 1/0026 |

FOREIGN PATENT DOCUMENTS

| | | | | |
|---|---|---|---|---|
| EP | 2485529 A1 | * | 8/2012 | H04W 76/021 |
| EP | 2485529 B1 | * | 11/2013 | H04W 76/021 |
| ES | 2443872 T3 | * | 2/2014 | H04W 76/021 |
| WO | 2013/138779 | | 9/2013 | |
| WO | 2014/062104 | | 4/2014 | |
| WO | WO-2014182714 A1 | * | 11/2014 | H04W 36/24 |
| WO | WO-2014183617 A1 | * | 11/2014 | H04B 7/15507 |
| WO | WO-2017171900 A1 | * | 10/2017 | H04W 12/04 |

OTHER PUBLICATIONS

3GPP, "LTE-Advanced Technology Introduction, White Paper", Jul. 2013, vol. 11, Rohde & Schwarz, 39 pages.

Hsu et al., "Dynamic Cooperating Set Planning for Coordinated Multi-Point (CoMP) in LTE/LTE-Advanced Systems", Dec. 2013, 6 pages.

Radio-Electronics.com, "4G LTE CoMP, Coordinated Multipoint Tutorial", <http://www.radio-electronics.com/info/cellulartelecomms/lte-long-term-evolution/4g-lte-advanced-comp-coordinated-multipoint.php>.

Irmer et al., Coordinated Multipoint: Concepts, Performance, and Field Trial Results, IEEE Communications Magazine, Feb. 2011, pp. 102-111.

(56) References Cited

OTHER PUBLICATIONS

The 3G4G Blow Coordinated Multi-Point (CoMP) transmission and reception, 2010, 14 pages, printed Feb. 26, 2015, http://blog.3g4g.co.uk/2010/02/coordinated-multi-point-comp.html.
Mahalingam, Nagi, "Coordinated Multipoint Tx and Rx," White Paper Radisys, Radisys Corporation, Sep. 2011, 7 pages.
Ghaleb et al., "QoS-Aware Joint Uplink-Downlink Scheduling in FDD LTE-Advanced with Carrier Aggregation," IEEE, 2014, pp. 111-115.

* cited by examiner

COORDINATED MULTIPOINT SET SELECTION BASED ON DONOR STATUS

BACKGROUND

Many people use mobile stations, such as cell phones, personal digital assistants (PDAs), tablet computers, laptop computers, desktop computers, in-car computers, and so on, to communicate with cellular wireless networks. These WCDs and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

To meet increasing demand for high-speed data on mobile devices, cellular service providers have begun implementing "4G" networks, which provide service under one or more 4G air interface protocols, such a long-term evolution (LTE) protocol. LTE was developed by the $3^{rd}$ Generation Partnership Project (3GPP), and is based on GSM/EDGE and UMTS/HSPA network technology.

In the context of LTE, a mobile station is typically referred to as a "user equipment" (UE), and may take various mobile and stationary forms, such as a mobile phone, tablet computer, laptop computer, desktop computer, or any other device configured for wireless communication. Herein, the terms "mobile station," "wireless communication device" (or WCD), and "user equipment" (or UE) may be used interchangeably. Further, in the context of LTE, a base station is typically referred to as an "eNodeB." Herein, the terms "base station" and "eNodeB" may be used interchangeably.

In an ideal arrangement, the base stations of a cellular wireless system would provide seamless coverage throughout a region, so that UEs being served by the system could move from coverage area to coverage area without losing connectivity. In practice, however, it may not be possible to operate a sufficient number of base stations or to position the base stations in locations necessary to provide seamless coverage. As a result, there may be holes in coverage.

One way to help solve this problem is to install a wireless relay that extends the range of a base station's coverage area so as to partially or completely fill a coverage hole. Such a relay may be configured with a wireless backhaul interface for communicating with the base station in much that same way a UE does, and a wireless access interface for communicating with and serving one or more UEs in much the same way that a base station does. The relay may further include control logic for actively bridging the backhaul communications with the access communications. The relay may thus receive and recover downlink communications from the base station and transmit those communications to UEs, and receive and recover uplink communications from UEs and transmit those communications to a base station.

Typically, a base station with which a wireless relay communicates is referred to as a "donor base station" (or "donor eNodeB," in the context of LTE), and the wireless relay itself is referred to as a "relay base station" (or "relay eNodeB," in the context of LTE). A relay base station or relay eNodeB may also be referred to herein simply as a "relay node."

Advantageously, a relay base station can have a relatively small form factor, with antenna height lower than the donor base station and with reduced transmit power requirements. Consequently, a cellular wireless service provider may conveniently employ such relay base stations throughout a region to efficiently fill coverage holes and help improve service quality.

In some cases, a wireless service provider may wish to extend coverage by installing a relay base station, which may also be referred to as a "mini-macro" (MM) base station, at a location outside of the signal range of an existing base station. To do so, the relay base station may be configured to couple (e.g., via a local area network or other wireless connection) with a UE, which may be referred to as a "relay UE," which is served by a donor base station in much the same way that the donor base station serves other UEs.

With this arrangement, when the relay UE attaches with the donor base station, the relay UE may acquire connectivity and an IP address as discussed above for instance. But based on a profile record for the relay UE, the network (e.g., a signaling controller) may recognize that the relay UE is a relay UE (rather than a normal end-user UE) and may therefore set up a bearer connection for that relay UE with a special core network gateway system (e.g., "SAE GW") that provides for internal core network connectivity and assigns the relay UE with an IP address for use to communicate within the core network. Once the relay UE receives that core network IP address assignment, the relay UE may then convey that IP address to the relay base station for use by the relay base station as the relay base station's IP address on the core network. The relay base station may then operate as a full-fledged base station of the network, having IP-based interfaces with other core network entities (e.g., a signaling controller, a gateway system, and other base stations), albeit with those interfaces passing via the wireless backhaul connection provided by the relay UE, and via the core network gateway system.

Once the relay base station is thus in operation, the relay base station may then serve UEs in the same way as a standard base station serves UEs. Thus, when a UE enters into coverage of the relay base station, the UE may signal to the relay base station to initiate an attach process, the UE may acquire an IP address, and an MME may engage in signaling to establish one or more bearers between the UE and a gateway system. Each of these bearers, though, like the relay base station's signaling communication, would pass via the relay's wireless backhaul connection.

Herein, the term "relay node" may be used to refer a relay base station with a direct wireless backhaul connection to a donor base station, and to the combination of a relay base station and a relay UE that provides the relay base station with a wireless backhaul link to a donor base station. Further, the wireless communication link between a relay base station or relay UE and the donor base station may be referred to as a "relay backhaul link," while a wireless communication link between a relay base station and a UE may be referred to as a "relay access link." Similarly, the wireless communication link between a donor base station and a UE may be referred to as a "donor access link."

In a further aspect of some protocols, such as LTE, reception at cell edges may be problematic for various reasons. For example, the greater distance to a base station at a cell edge may result in lower signal strength. Further, at a cell edge, interference levels from neighboring cells are likely to be higher, as the wireless communication device is generally closer to neighboring cells when at a cell edge.

In an effort to improve the quality of service at cell edges, 3GPP LTE-A Release 11 introduced a number of Coordinated Multipoint (CoMP) schemes. By implementing such CoMP schemes, a group or cluster of base stations may improve service at cell edges by coordinating transmission and/or reception in an effort to avoid inter-cell interference, and in some cases, to convert inter-cell interference into a usable signal that actually improves the quality of service that is provided.

LTE-A Release 11 defines a number of different CoMP schemes or modes for both the uplink (UL) and the downlink (DL). For the downlink, there or two basic types of CoMP modes: coordinated scheduling/beamforming (CSCH or DL-CSCH) and joint processing. When coordinated scheduling/beamforming is implemented for a given UE, data is only sent to the given UE in one cell at a time, but scheduling and beamforming decisions for the given UE are coordinated amongst multiple cells. When a type of joint processing referred to as joint transmission is implemented for a given UE, data is transmitted to the UE in multiple cells concurrently. Other types of CoMP schemes on the uplink and downlink also exist.

OVERVIEW

When a base station, such as an eNodeB (or "eNB") in an LTE network, is operating as a donor base station (e.g., as a donor eNodeB) for one or more relay nodes, it effectively provides service to both its own coverage area and the coverage areas served by the relay node(s). Thus, demand for air interface resources (and the amount of data traffic) in a cell where a relay node (e.g., a relay eNodeB and/or a relay UE) has established a wireless relay backhaul link to a donor eNodeB is likely to be higher than cells where no relay backhaul links are established. Further, when an eNodeB serves as a donor eNodeB, its own backhaul link will be utilized to facilitate its own operation and the operation of the relay eNodeB(s) it supports. Thus, the traffic level on a donor eNodeB's wired backhaul link will often be greater than the traffic level on a non-donor eNodeB's backhaul link.

In a further aspect, when cells cooperate to provide coordinated multipoint (CoMP) service, transmissions to and/or from a given user equipment (UE) are sent from and/or received by multiple cells in the UE's cooperating set (and perhaps in different sets of cells, in the scenario where a UE has different uplink and downlink cooperating sets). Therefore, when CoMP service is provided to a given UE via joint transmission and/or joint reception in multiple cells, uplink and/or downlink air-interface resources where they would not be utilized in the absence of CoMP. Thus, providing uplink CoMP service can also increase the burden placed on the air interface resources in coordinating cells. Furthermore, in a scenario where the cells that cooperate to provide CoMP service to a given UE are served by different eNodeBs, these eNodeBs engage in messaging and data exchange over backhaul links (e.g., X2 links). Thus, CoMP can also increase the level of backhaul traffic to and/or from an eNodeB that provides CoMP service.

Since the separate configurations to (i) operate as donor base station and (ii) provide CoMP service can both increase the load an eNodeB's traffic channels and/or increase the load on an eNodeB's backhaul link(s), it may be desirable to avoid or reduce the likelihood of a base station simultaneously serving as a donor base station and providing uplink and/or downlink CoMP service. Accordingly, example embodiments may help to dynamically determine which cells should be included in a cooperating set that provides uplink CoMP to a given UE, based on the donor base station configurations of the eNodeB(s) that serve cells under consideration for inclusion in a CoMP cooperating set.

In one aspect, an exemplary method involves an entity of an access network, such as an eNodeB in an LTE network: (a) determining a donor status of a first base station that serves a first cell, wherein the donor status indicates whether or not the first base station is configured as a donor base station for at least one relay node; and (b) based at least in part on the determined donor status of the first base station, determining whether or not to include the first cell in a CoMP cooperating set, wherein at least one UE is provided CoMP service by the CoMP cooperating set.

Another exemplary method involves an entity of an access network: (a) determining a set of candidate cells under consideration for inclusion in a CoMP cooperating set; (b) for each of one or more of the candidate cells, determining a donor status for a base station serving the candidate cell, wherein the donor status indicates whether or not the base station is configured as a donor base station for at least one relay node; and (c) using each determined donor status as a basis for determining whether to include the corresponding candidate cell in the CoMP cooperating set.

Yet another exemplary method involves an entity of an access network: (a) determining a set of candidate cells under consideration for inclusion in a CoMP cooperating set; (b) for each of one or more of the candidate cells, determining a donor status corresponding to the candidate cell, wherein the donor status indicates whether or not a relay backhaul link is established via the candidate cell; and (c) using the one or more determined donor statuses for the one or more of the candidate cells as a basis for determining one or more of the candidate cells to include in the CoMP cooperating set.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

Exemplary embodiments of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Further, methods and systems may be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

I. ILLUSTRATIVE NETWORK AND RELAY BASE STATION CONFIGURATION

Figure 1A:
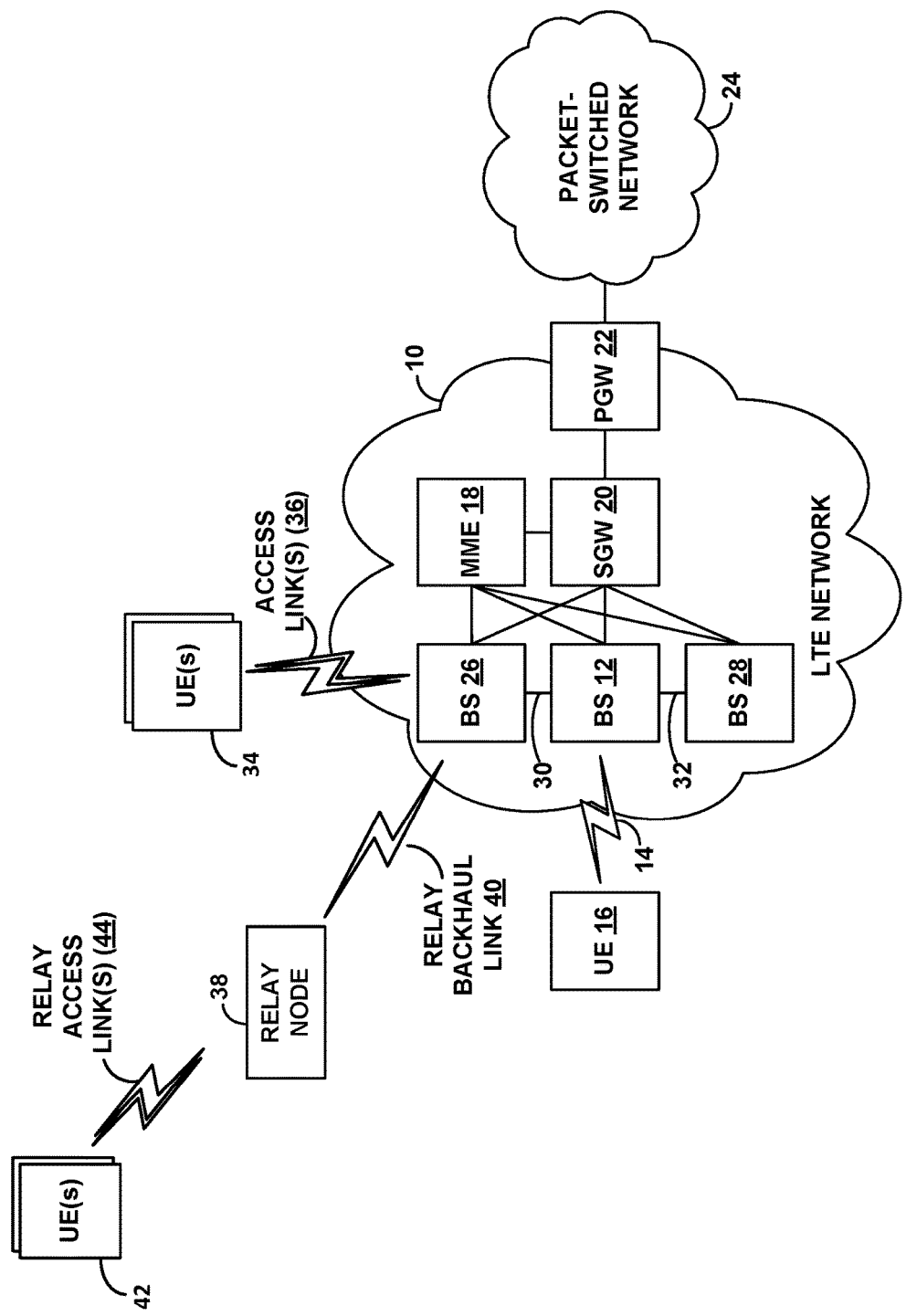
FIG. 1A is a simplified block diagram of a wireless communication system, according to exemplary embodiments.

Referring to the drawings, as noted above, FIG. 1A is a simplified block diagram of a wireless communication system in which the present method and system can be implemented. In particular, FIG. 1A depicts a representative LTE network 10, which functions primarily to serve UEs with wireless packet data communication service, including possibly voice-over-packet service, among other possible functions. As shown, the LTE network includes a base station (BS) 12 (which could also be referred to as an evolved Node B (eNodeB) 12). The BS 12 has an antenna structure and associated equipment for providing an LTE coverage area 14 in which to serve UEs such as an example UE 16 as shown. The BS 12 then has a communication interface with a mobility management entity (MME) 18 that functions as a signaling controller for the LTE network. Further, the BS 12 has a communication interface with a serving gateway (SGW) 20, which in turn has a communication interface with a packet-data network gateway (PGW) 22 that provides connectivity with a packet-switched network 24 such as the Internet, and the MME 18 has a communication interface with the SGW 20.

According to LTE, each carrier's downlink channel may then define various sub-channels, such as a physical downlink control channel (PDCCH) for carrying scheduling directives and other control signaling from the eNodeB 12 to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB 12 and a physical uplink shared channel (PUSCH) for carrying scheduled uplink data communication.

With this arrangement, when the UE 16 enters into coverage of the eNodeB 12, the UE 16 may detect the eNodeB's 12 coverage on a particular carrier, and the UE 16 may engage in an attach process or handover process to register with the LTE network 10 on that carrier. For instance, the UE 16 may initially transmit to the eNodeB 12 an attach request, which the eNodeB 12 may pass along to the MME 18, triggering a process of authenticating the UE 16 and establishment of one or more logical bearer connections for the UE 16 between the eNodeB 12 and the PGW 22.

Further, the UE 16 may engage in signaling with the eNodeB 12 to establish a radio-link-layer connection (i.e., air interface connection) on the detected carrier, so that the eNodeB 12 may then serve the UE 16 on that carrier. For instance, the UE 16 and the eNodeB 12 may exchange radio resource control RRC configuration messaging to prepare the eNodeB 12 to serve the UE 16 on the carrier and to prepare the UE 16 to be served on the carrier. In this process, the eNodeB 12 may store a context record for the UE 16, indicating that the eNodeB 12 is serving the UE 16 on the particular carrier, so that the eNodeB 12 may then serve the UE 16 on the indicated carrier (e.g., then exchanging control signaling and bearer traffic with the UE 16 on that carrier) per that context record. Further, the UE 16 may store a context record indicating that the UE 16 is being served on that carrier, so that the UE 16 can then be served on that carrier (e.g., then exchanging control signaling and bearer traffic with the eNodeB 12 on that carrier) per that context record. As such, the radio-link-layer connection could be considered to effectively encompass initially just that one carrier.

Moreover, the illustrated communication system includes two other BSs 26 and 28 each interconnected with network infrastructure, such as with the MME 18 and the SGW 20, providing connectivity with one or more networks (e.g., the packet-switched network 24). Additionally, the various BSs 12, 26, and 28 may engage in signaling communication with each other. For example, BS 12 and BS 26 may communicate with each other over an X2 interface 30, which may physically pass through the core network(s) or over a more direct physical connection between the BS 12 and the BS 26. And BS 12 and BS 28 may communicate with each other over an X2 interface 32, which may physically pass through the core network(s) or over a more direct physical connection between the BS 12 and the BS 28.

Furthermore, in the scenario illustrated in FIG. 1A, BS 26 is configured as a donor BS (or donor eNodeB). As such, BS 26 is configured to serve a relay node (RN) 38 over one or more relay backhaul links 40, and may also serve one or more end-user UEs 34 respectively over one or more donor access links 36. Additionally, FIG. 1A illustrates that the RN 38 may then itself serve one or more end-user UEs 42 respectively over one or more relay access links 44. The RN 38 may thus be a relay base station or relay eNodeB, for example.

Through this communication system, each of the one or more UEs 34 may thus engage in communication on the network 24 via at least one of the access links 36, the BS 26, and the network infrastructure. Also, each of the one or more UEs 42 may engage in communication on the network 24 via at least one of the relay access links 44, the RN 38, at least one of the relay backhaul links 40, the BS 26, and the network infrastructure. Moreover, when RN 38 engages in X2 communications with another BS (e.g., with the BS 12 over the X2 interface 30) and/or with other core network entities, those communications would pass via a wireless relay backhaul link 40, the BS 26, and possibly other network infrastructure.

Given this arrangement, when a UE enters into coverage of a given one of the above-described BSs, the UE may detect that BS's coverage on a particular carrier, and the UE and the BS may then engage in an attach process or handover process to register the UE with the network on that carrier. For instance, the BS and the UE may engage in radio resource control (RRC) signaling to establish on the carrier an RRC connection defining a radio-link-layer connection between the UE and the BS. Further, the UE may transmit to the BS an attach request, which the BS may pass along to the network infrastructure (e.g., to the MME 18), triggering a process of authenticating the UE and establishing one or more bearer connections for the UE between the BS and the network infrastructure, among other operations. Moreover, through this process, the BS, the network infrastructure, and/or the UE may each store a context record indicating that the BS is serving the UE on that carrier and perhaps also indicating other information.

With the arrangement of FIG. 1A, a UE 42 may engage in communication with various remote communication-entities, such as servers or other end-user devices, on or via network 24. These entities may take various forms and may be configured to communicate different types of content.

In the arrangement shown in 1A, the relay node 38 is described as taking the form of a relay base station with a relay backhaul link 40 via a direct wireless connection to the donor base station 26. As noted above, a relay node may also take the form of a relay base station and a relay UE, where the relay base station connects to the relay UE via a wireless relay access link, and the relay UE provides the relay base station with a backhaul connection via a wireless relay backhaul link between the relay UE and a donor base station.

Figure 1B:
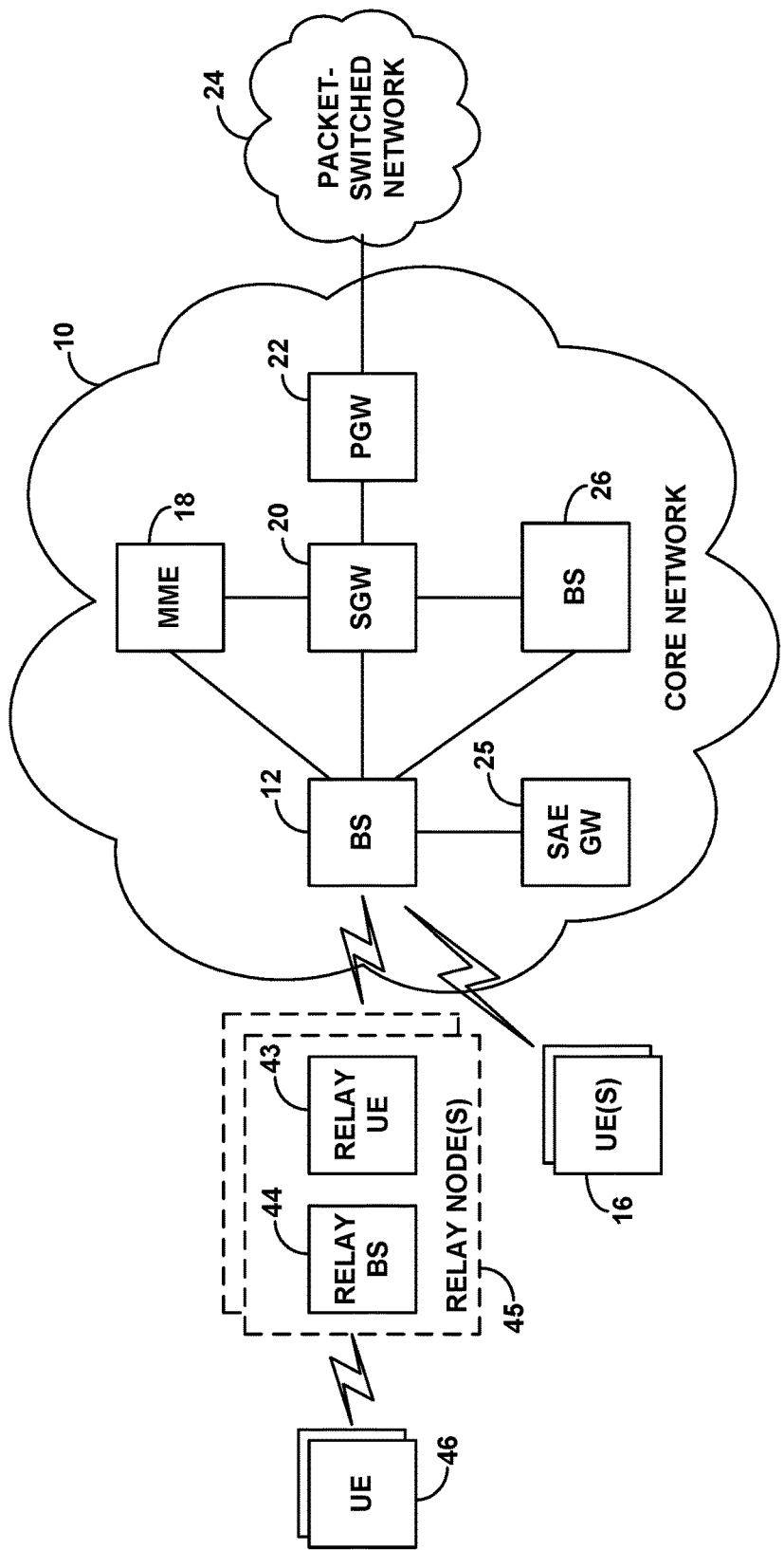
FIG. 1B is another simplified block diagram of a wireless communication system, according to exemplary embodiments.

FIG. 1B is another simplified block diagram of a wireless communication system in which the present method and system can be implemented. More specifically. FIG. 1B shows an arrangement where a relay base station connects to a relay UE in order to be provided with a wireless relay backhaul link to a donor base station.

FIG. 1B also shows a plurality of UEs within coverage area(s) of base station 12, including at least one relay UE 43 and at least one non-relay UE 16. Each non-relay UE 16 may be an end-user UE (e.g., a cell phone, tablet computer, tracking device, etc.) that is not set to provide wireless backhaul connectivity for a relay base station. Whereas, each relay UE 43 may be a UE that is set to provide wireless backhaul connectivity for a relay base station 44. As such, a relay UE could be a conventional UE (e.g., cell phone or the like) that is locally coupled with a relay base station (e.g., via a local area network or direct cable or wireless connection) and that is configured to operate as a relay UE for the relay base station, or the relay UE could be a UE module that is incorporated within a base station, thereby allowing the base station to obtain wireless backhaul connectivity and thus function as a relay base station.

Relay UE 43 and relay base station 44 cooperatively define a relay node 45. As such, base station 12 serves as a donor base station for relay node 45 and as a conventional base station for each non-relay UE 16. Further, relay node 45 has a wireless relay backhaul link with the donor base station 12, and provides its own wireless coverage for serving one or more other UEs 46.

In practice, each of these UEs may be configured within the network 10 as a device to be served by the network (such as an authorized subscriber device), and a mechanism may be provided to distinguish relay UEs from conventional UEs, so as to facilitate treating relay UEs differently than conventional UEs. By way of example, a relay UE may have a special identifier or operate and be served by the network under a special network identifier (e.g., a special public land mobile network (PLMN) identifier, or special packet data network (PDN) connection identifier), indicating that the relay UE will be operating as a relay UE. Whereas a conventional UE may have an identifier or be served by the network under an identifier that does not indicate the UE will be operating as a relay UE and thus that may establish the UE is not a relay UE. Accordingly, when a UE attaches with the network, such as with base station 12, the network (e.g., the base station, MME, and/or other network entity) may determine whether the UE is a relay UE (i.e., whether the UE provides wireless backhaul connectivity for a relay base station) or not, based on such identification or other information provided by the UE during attachment or noted in a network profile record for the UE.

In an LTE network such as this, when base station 12 is put in service, the base station 12 may acquire an IP address for use within the network 10. Further, the base station 12 may then engage in signaling ((stream control transmission protocol (SCTP) signaling) with MME 14 to establish an S1-AP connection (S1-AP interface) with the MME. To facilitate this, the base station 12 may be pre-provisioned with data specifying the IP address of the MME so that the base station 12 can engage in signaling with the MME to set up such a connection. This S1-AP connection with the MME then serves as a signaling channel between the base station 12 and the MME.

When a UE (such as UE 16) initiates attachment with base station 12, base station 12 may then signal to the MME to trigger establishment for the UE of an S1-MME connection (S1-MME interface) between the base station 12 and the MME. Further, this signaling also causes the MME to engage in signaling to establish some other connections for the UE, which may vary based on whether the UE is a conventional UE or rather a relay UE (e.g., as indicated by the UE's PLMN identifier or other data). If the UE is a conventional UE, then the MME may engage in signaling with the base station 12 and SGW 20 to establish for the UE an S1-U connection (S1-U interface) between the base station 12 and the SGW 20 and an S5 connection (S5 interface) between the SGW 20 and the PGW 22, and PGW 22 may assign to the UE an IP address for use on external packet-switched network 24. Whereas, if the UE is a relay UE, then the MME may engage in signaling with the base station 12 and special core network gateway system (SAE GW) 25 to establish for the UE an S1-U connection between the base station 12 and the SAE GW 25 and, internally within the SAE GW 25, an S5 connection, and the SAE GW 25 may assign to the UE an IP address for use internally within the core network 10.

In line with the discussion above, once relay UE 43 acquires connectivity with donor base station 12 and receives an IP address assignment, the relay UE 43 may then provide that IP address to its relay base station 44, so that the relay base station 44 can use that IP address as its own address for communicating with other entities in the core network 10. The relay UE 43 and relay base station 44 may each be programmed with processor logic to facilitate this. Once the relay base station 44 thus has an IP address on the core network, communications that the relay base station 44 has in the core network 10 will pass via a tunnel through (i) the relay UE 43, (ii) the radio link between the relay UE 43 and the donor base station 12, and (iii) the SAE GW 25.

When the relay base station 44 thus acquires an IP address in the core network 10, the relay base station 44, like base station 12 on the core network, will form an S1-AP connection with an MME (which could be the same or different than that used by base station 12). To facilitate this, the relay base station 44 may be pre-provisioned with data specifying the IP address of the MME so that the relay base station 44 can engage in signaling with the MME to set up such a connection, via the SAE GW 25. This S1-AP connection with the MME then serves as a signaling channel between the relay base station 44 and the MME.

Further, when a UE 46 initiates attachment with relay base station 44, relay base station 44 may then signal to the MME to trigger establishment for the UE 46 of an S1-MME connection between the relay base station 44 and the selected MME, an S1-UE connection between the relay base station 44 and the SGW 20, and an S5 connection between the SGW 20 and the PGW 22, with PGW 22 assigning to UE 46 an IP address for use on external packet-switched network 24, again with all of these connections possibly passing via the SAE GW.

II. COORDINATED MULTIPOINT

As noted above, a network such as communication network 10 may implement various types of coordinated multipoint (CoMP) service, through which base stations (e.g., eNodeBs) may coordinate to improve uplink and/or downlink service. As noted above, CoMP schemes designed for coordinated transmission by base stations may be referred to as downlink CoMP modes, while CoMP schemes designed for coordinated reception may be referred to as uplink CoMP modes.

Figure 1C:
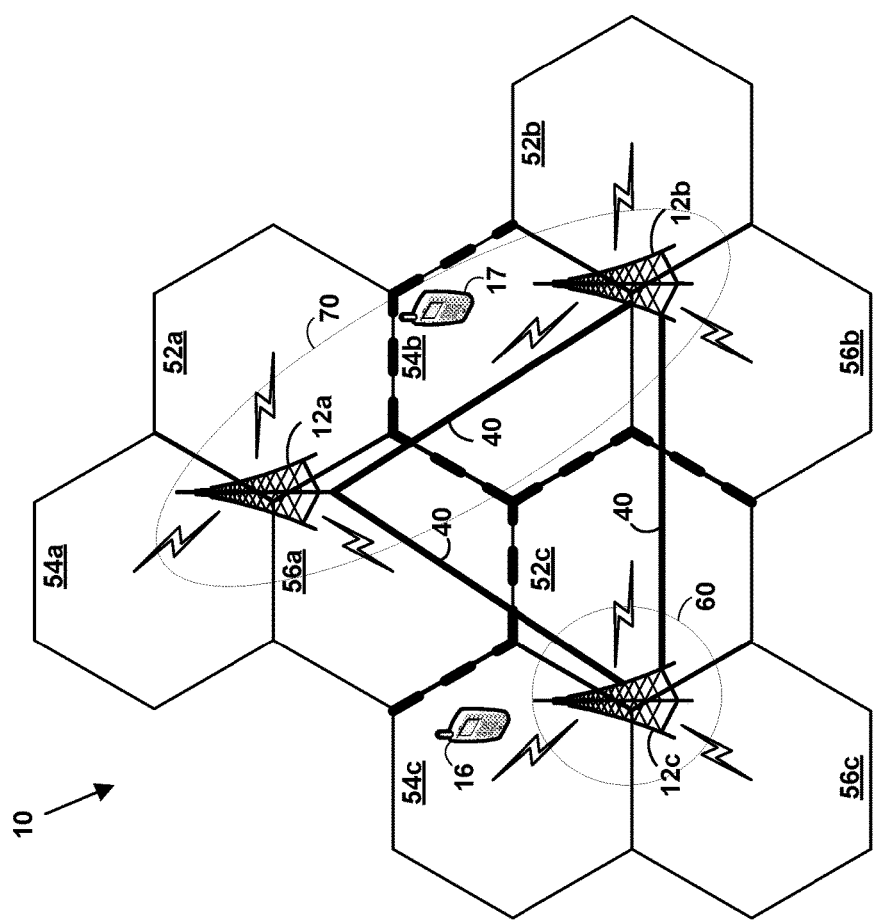
FIG. 1C is a simplified block diagram illustrating a portion of communication network in which coordinated multipoint schemes may be implemented for uplink and/or downlink communications, according to exemplary embodiments.

FIG. 1C is a simplified block diagram illustrating a portion of communication network 10 in which CoMP schemes may be implemented for uplink and/or downlink communications. In particular, FIG. 1C shows a portion of an LTE network, which includes three eNodeBs 12a to 12c. More or less eNodeBs, and/or other types of access points or base transceiver stations, are also possible.

As shown, eNodeB 12a is serving three coverage areas or cells 52a, 54a, and 56a, eNodeB 12b is serving three coverage areas or cells 52b, 54b, and 56b, and eNodeB 12c is serving three coverage areas or cells 52c, 54c, and 56c. Further, a UE 16 is operating in cell 54c, which is served by eNodeB 12c. Further, while not shown in FIG. 1C, each eNodeB 12a to 12c may be configured in the same or in a similar manner as the eNodeB 12 shown in FIG. 1A. For instance, each eNodeB 12a to 12c may be communicatively coupled to an MME and/or an SGW. Further, note that some or all of eNodeBs 12a to 12c may be communicatively coupled to the same MME and/or the same SGW. Alternatively, each eNodeB 12a to 12c might be connected to a different MME and/or different SGW.

In some cases, CoMP may be implemented by a single base station, which provides service in multiple cells. This type of CoMP scheme may be referred to as an "intra base station" or "intra-eNodeB" CoMP scheme. For example, eNodeB 12c may provide downlink CoMP by jointly transmitting data to a UE in two or more of the cells 52c, 54c, and 56c that are served by eNodeB 12c. In particular, eNodeB 12c may define a CoMP coordinating set 60 for a UE to include all its cells 52c, 54c, and 56c. As such, eNodeB 12c may use joint transmission techniques to transmit the downlink signal to UE 16 in two or more of the cells 52c, 54c, and 56c that are served by eNodeB 12c.

In other cases, CoMP may be implemented by multiple base stations, which may each provide service to a given UE one cell or multiple cells. This type of CoMP scheme may be referred to as an "inter base station" or "inter-eNodeB" CoMP scheme. For example, eNodeBs 12a and 12c may provide downlink CoMP to UE 17 by jointly transmitting the same data to UE 17 in two or more of cells 52a, 54a, 56a, 52b, 54b, and 56b.

When CoMP involves multiple base stations (e.g., inter-base station CoMP), the base stations may coordinate with one another via a backhaul network, which allows for communications between base stations and/or other network components. For example, in an LTE network, eNodeBs may communicate via links that are referred to as X2 interfaces. X2 is described generally in Technical Specification ETSI TS 136 420 for LTE; Evolved Universal Terrestrial Radio Access Network (E-UTRAN); X2 general aspects and principles. In FIG. 1C, eNodeBs 12a to 12c are communicatively connected via X2 links 40. It should be understood, however, that other types of backhaul communications are also possible.

When a joint transmission (JT) CoMP scheme is implemented on the downlink, the downlink signal can be transmitted to UE 16 in multiple cells simultaneously. As such, a UE can combine downlink signals received in multiple cells to improve reception and/or quality of service. For example, if cells 56a, 52c, and 54c are coordinated to provide CoMP to UE 16, then UE 16 may combine the downlink signals from these cells.

In practice, the eNodeB(s) serving the cells in a given UE's cooperating set may share data that is intended for the given UE, so that the data may be jointly processed and transmitted. For example, if the cooperating set for UE 16 includes cells 56a, 52c, and 54c, then eNodeBs 12a and 12c may coordinate in an effort to improve pre-coding matrices for inter-cell coordination, such that the SINR increases at UE 16. After applying such pre-coding at each eNodeB 12a and 12c, eNodeBs 12a and 12c then transmit to the UE 16 on the same resource block of the physical downlink shared channel (PDSCH) in cells 52c, 54c and 56a.

In a further aspect, the set of cells that cooperate to provide CoMP service to a given UE may be referred to herein as the UE's "cooperating set". The cooperating set for a given UE is the set of geographically separated points (e.g., cells) that are directly or indirectly engaged in downlink CoMP service for the UE (e.g., directly or indirectly participating in PDSCH transmission to the UE). In some cases, all UEs in the cooperating set transmit to the UE. However, depending upon the particular CoMP scheme and/or other factors, only a subset of the coordinating set transmit the PDSCH to the UE in each frame. The subset of the cooperating set that transmit to a given UE are referred to as the UE's "transmission points." (In the case, where all cells in the cooperating set transmit the PDSCH to the UE, the UE's transmission points and cooperating set are identical.)

The cooperating set for a given UE 16 may include a "serving cell" and one or more other "cooperating cell(s)". The other cells coordinating the UE's downlink transmissions with the serving cell (also referred to as "transmission points" for the UE) will mirror the serving cell's physical DL shared channel (PDSCH) configuration for the UE. Note that in some implementations, the same cooperating set may provide both uplink and downlink CoMP service to a given UE. Alternatively, the uplink CoMP cooperating set for a given UE may differ from the cooperating set that provides downlink CoMP service to the given UE.

The UE's serving cell may be assigned to the UE in various ways. For example, the serving cell may be the cell for which the UE measures the highest Reference Signal Received Power (RSRP). Of course, other techniques for selecting the serving cell are also possible. Further, in some implementations of CoMP, the serving cell for a given UE may be dynamically updated as network conditions change.

In an LTE network, the eNodeB for the serving cell in a UE's CoMP cooperating set (or another network entity) may determine the other cell or cells that coordinate to provide CoMP service to UE (i.e., the other cells in the cooperating set), at a given point in time. Alternatively, the cooperating set may be determined, and the serving cell for a UE may then be selected from the UE's cooperating set.

In some embodiments, the cooperating set for a given UE 16 may be determined dynamically, based on various factors. For instance, the eNodeB for the serving cell of UE 16, and/or another network entity or entities, may initially determine a "measurement set" for which the UE is instructed to measure certain channel state information (CSI). The selection of cells to include in the measurement set may be based on various criteria, such as criteria indicating signal strength, signal quality, and/or other channel conditions. For instance, each transmission point in an LTE network may transmit a CSI reference signal (CSI-RS) and/or a cell-specific reference signal (CRS). A UE may scan for these signals and provide regular radio resource management reports, which include measurements based on the CSI-RS and/or CRS for signals it has detected, such as a channel quality indicator (CQI), a rank indicator (RI), and/or a precoder matrix indicator (PMI), among other possibilities. These measurement may then be used by the LTE network to determine a measurement set for the UE. Alternatively, cells in measurement sets could be pre-defined (e.g., as clusters of adjacent cells).

Once provided with a measurement set, the UE 16 measures and reports certain channel state information (CSI) for the cells in the measurement set. For instance, the UE 16 may report CSI-based measurements for cells in the measurement set in the form of a reference signal received power (RSRP) report and/or a reference signal received quality (RSRQ) report. The set of cells for which the UE actually reports channel state information is referred to as the UE's "reporting set." (In some CoMP implementations, the UE is permitted to down-select from the measurement set when reporting channel state information. In other words, the UE may selectively report channel state information for only a subset of the cells in the measurement set. In such cases, the reporting set will be a subset of the UE's measurement set.)

Once a UE 16 has provided the network with channel state information for the reporting set, the network (e.g., the eNodeB operating the UE's serving cell) uses this channel state information to select the cooperating set for the UE. More specifically, the eNodeB may use the reported channel state information (e.g., as reported in the RSRP and/or RSRQ) and/or other information to select cells from the reporting set for inclusion in the UE's cooperating set.

In some CoMP implementations, the network (e.g., the eNodeB operating the UE's serving cell) may perform further analysis to select a subset of the cooperating set to serve as the UE's transmission points for CoMP. In such cases, the selection of eNodeBs for the cooperating set may be based on various factors, including, but not limited to, whether or not a signal from the given UE is received in a candidate cell, signal strength measurements, other indicators of air interface conditions, and/or processing load at eNodeBs serving cells in the measurement set, among other possibilities. Further, in exemplary embodiments, the selection of cells for the cooperating set may also be based upon the donor status of cells under consideration for the cooperating set and/or the donor status of eNodeB(s) serving cells under consideration for the cooperating set.

III. EXEMPLARY NETWORK COMPONENTS

Figure 2:
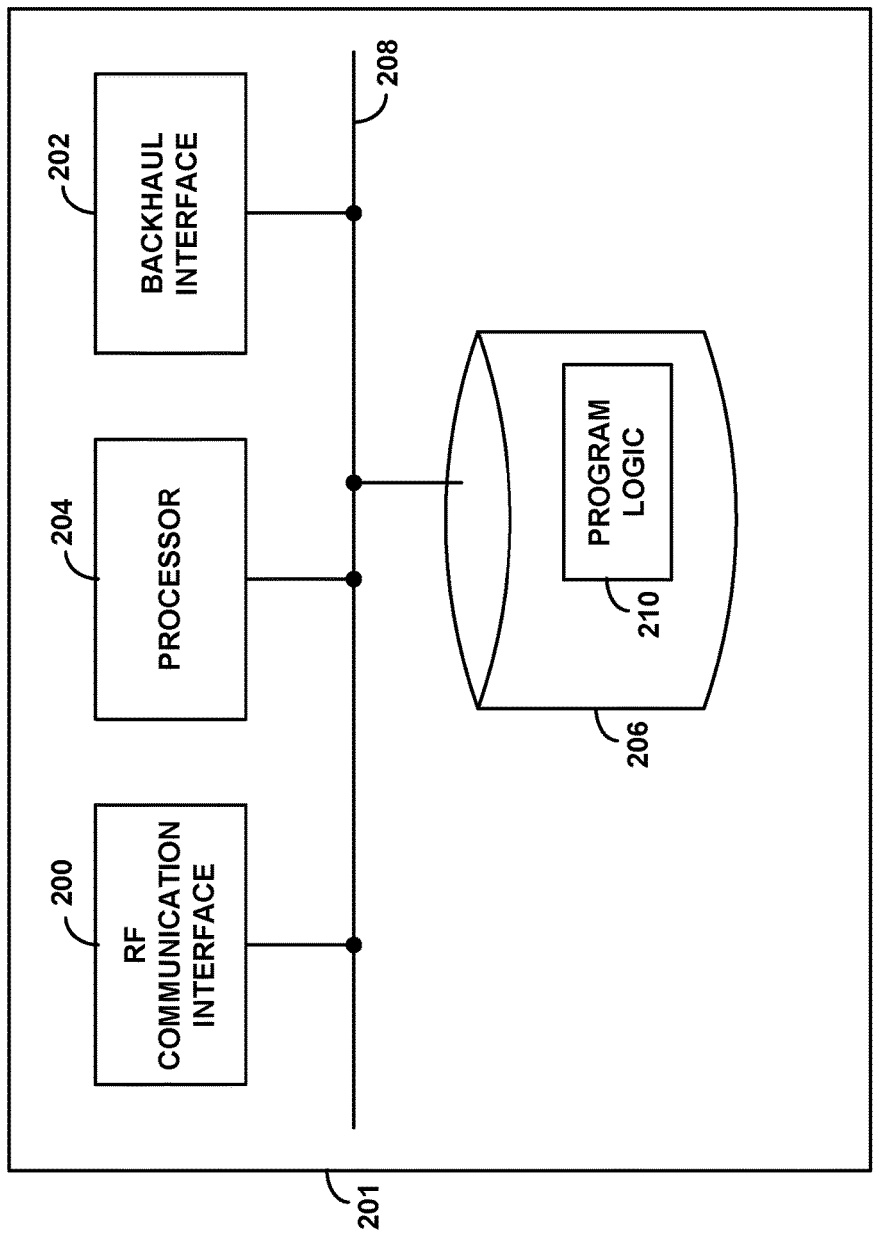
FIG. 2 is a simplified block diagram exemplifying a network component, according to an exemplary embodiment.

FIG. 2 is a simplified block diagram exemplifying a network component, according to an exemplary embodiment. In particular, FIG. 2B illustrates functional components that might be found in a network component 201 that is arranged to operate in accordance with the embodiments herein. As shown, the network component 201 may include a communication interface 200, a backhaul interface 202, a processor 204, and data storage 206, all of which may be communicatively linked together by a system bus, network, or one or more other connection mechanisms 208.

In practice, network component 201 may take the form of an eNodeB, or may take the form of another component of an LTE or CDMA network. Further, the illustrated components of network component 201 (e.g., communication interface 200, a backhaul interface 202, a processor 204, and/or data storage 206) may be distributed and/or subdivided between one or more entities in an LTE network and/or in a CDMA network. It should be understood that an exemplary system may also take the form of another network entity or combinations of other network entities, without departing from the scope of the invention.

In network component 201, communication interface 200 may comprise one or more or wired or wireless communication interfaces and/or other associated equipment for engaging in communications with other network entities and/or for engaging in RF communications with mobile stations according to one or more air interface protocols. Chipsets, antennas, and/or other components for such RF communications are readily available and well known to those skilled in the art. Backhaul interface 202 may comprise any sort of communication link or mechanism enabling the network component 201 to exchange signaling and bearer data with other network entities, such as an X2 link, for instance. Further, processor 204 may comprise one or more processors (e.g., general purpose and/or special purpose processors), such as microprocessors for instance. Chipsets, ports, and/or other components for such backhaul communications are readily available and well known to those skilled in the art.

Data storage 206 may be a non-transitory computer readable medium. For example, data storage 206 may take the form of one or more volatile and/or non-volatile storage components, such as magnetic, optical, or organic storage components, integrated in whole or in part with processor 204. As further shown, data storage 206 contains program logic 210 (e.g., machine language instructions) executable by processor 204 to carry out various functions, such as the functionality of the exemplary methods and systems described herein.

In an exemplary embodiment, communication interfaces 200 may include an RF communication interface configured to receive an uplink signal from a UE in a first cell. Further, the network component may include program instructions stored in data storage 206, which are executable by processor 204 to carry out the functionality of a base station (e.g., an eNodeB) and/or other network components described herein.

IV. EXEMPLARY METHODS FOR SELECTING A COMP COOPERATING SET

Figure 3:
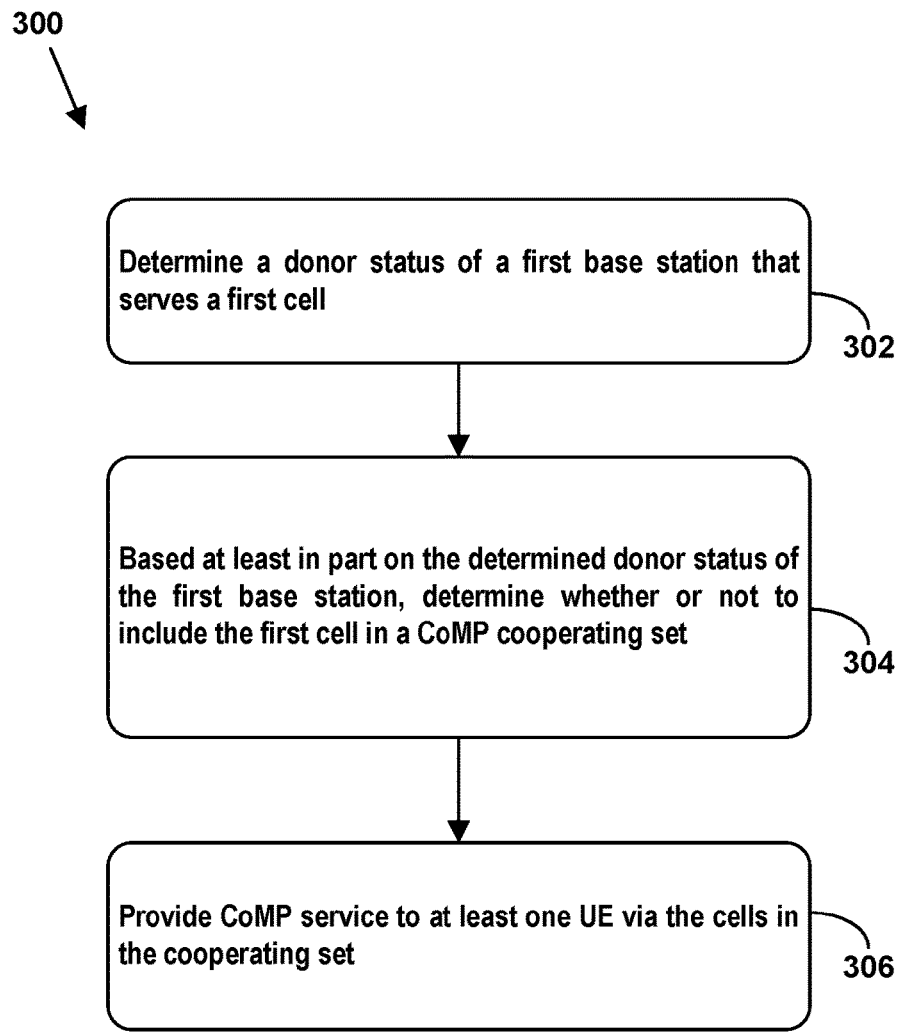
FIG. 3 is flow chart illustrating a method 300, according to an exemplary embodiment.

FIG. 3 is flow chart illustrating a method 300, according to an exemplary embodiment. Method 300 may be implemented by a base station (e.g., an eNodeB). Of course, it should be understood that method 300 or portions thereof may be implemented by other entities or combinations of entities, and/or may be implemented for other purposes, without departing from the scope of the invention.

As shown by block 302, method 300 involves an eNodeB determining a donor status of a first base station that serves a first cell. In exemplary embodiment, the determined donor status indicates whether or not the first base station (which may also be an eNodeB) is configured as a donor base station for at least one relay node. Then, based at least in part on the determined donor status of the first base station, the eNodeB determines whether or not to include the first cell in a CoMP cooperating set, as shown by block 304. The eNodeB (possibly along with other eNodeBs) may then provide CoMP service to at least one UE via the cells in the cooperating set, as shown by block 306.

A. Determining the Donor Status of a Base Station

As noted above, the donor status determined at block 302 can indicate whether or not the first base station whether the first base station serves as the donor for at least one relay node. In practice, this may involve determining whether or not an eNodeB supports at least one wireless relay backhaul link from a relay eNodeB or relay UE.

In some embodiments, the donor status of a given base station may include additional information, in addition or in the alternative to the indication as to whether or not the given base station is configured as a donor base station. For example, block 302 could additionally or alternatively involve determining a total number of relay base stations are served by the first eNodeB. In such embodiments, the donor status could be provided in the form of a data indicating whether or not the given eNodeB is configured as a donor eNodeB (e.g., a binary data field set to 1 or 0 to indicate whether or not the eNodeB is configured as a donor), combined with additional data field indicating the total number of relay eNodeBs served by the first eNodeB. Alternatively, the donor status could simply indicate the total number of relay eNodeBs served by the first eNodeB. In this case, when the total number of relay eNodeBs for a given eNodeB is equal to zero, this could serve as an implicit indication that the given eNodeB is not configured as a donor eNodeB. Similarly, when the total number of relay eNodeBs for a given eNodeB is one or greater, this indicates that the given eNodeB is configured as a donor eNodeB.

Block 302 could additionally or alternatively further involve determining other information related to operation as a donor base station, such as the identity of the relay base station(s) served by the first base station (e.g., base station ID(s)) and/or the cell identifier(s) of the cells in which relay base station(s) have established relay backhaul links to the first base station, among other possibilities.

In a further aspect, when an eNodeB is configured as donor via a relay backhaul link in one of its cells, this can increase the load on them eNodeB's own backhaul link. As such, when an eNodeB serves as a donor via a relay backhaul link in a first cell that it serves, the resulting increase in backhaul load can affect the performance in all cells served by the eNodeB, regardless of whether relay backhaul links are established in the other cells served by the eNodeB. However, since a relay backhaul link will also tend to increase the traffic and/or control channel loading in the particular cell where the relay backhaul link is established, the impact of a relay backhaul link may be greater in the cell where it is established (as compared to other cells served by the same eNodeB). Accordingly, donor status may additionally or alternatively, be determined on a cell-specific level. In such embodiments, determining the donor status may involve determining whether or not a relay backhaul link or links is/are established in a particular cell.

The eNodeB carrying out method 300 may determine the donor status of the first base station based on various types of information and/or information from various sources. In a scenario where the eNodeB carrying out method 300 and the first base station are one and the same, the eNodeB may have settings and/or system information that is indicative of its own configuration, and whether or not it is configured as a donor eNodeB. In this scenario, the eNodeB may utilize its knowledge of its own configuration to determine whether or not it is configured as a donor eNodeB.

In other cases, the eNodeB carrying out method 300 may differ from the first base station. For instance, the eNodeB carrying out method 300 may provide service in the serving cell for a given UE, and the first base station may be a different base station that provides service in neighbor cell, which is under consideration for inclusion in a CoMP cooperating set for the UE. In such cases, the eNodeB carrying out method 300 may query another network entity, which maintains data records or is able to access data records that indicate whether or not other base stations are currently configured as donor base stations.

In some embodiments, the eNodeB may determine the donor status from an element management system (EMS). For example, an EMS may store or may otherwise have access to information specifying whether particular base stations provide wireless relay backhaul connections. Accordingly, the eNodeB for a serving cell may query an EMS to determine whether or not another eNodeB is serving relay node(s) via wireless relay backhaul connection(s). It should be understood that the donor status may be determined via data provided by sources other than an EMS, without departing from the scope of the invention.

B. Determining Whether or not to Include a Cell in the Cooperating Set

At block 304, the donor status of a base station may be taken into account in various ways, when determining whether to include the base station in the CoMP cooperating set.

In some embodiments, the eNodeB may simply omit or remove any cell served by a base station configured as a donor base station, and/or any cell where a relay backhaul link is established, from the CoMP cooperating set. In some cases, such cells may be omitted or removed, so long as there a sufficient number (perhaps some predetermined minimum threshold number) of other cells that meet other criteria for inclusion in the cooperating set.

In some embodiments, the decision as to whether or not to include a cell in the cooperating set may additionally or alternatively be based upon a total number of relay backhaul links established via the given candidate cell. For example, consider a scenario where multiple candidate cells are served by donor eNodeB(s) and/or in which relay backhaul links are established, and there are not a sufficient number of other cells (e.g. less than a predetermined minimum threshold number) that meet other criteria for inclusion in the cooperating set. In this scenario, the respective number of relay nodes served via these candidate cells and/or by the eNodeB(s) serving these candidate cells may be utilized to determine which candidate cells to include in the cooperating set. For instance, when an eNodeB determines that one or more donor-associated cells should be included in the CoMP, the donor-associated cells supporting the most relay base stations may be selected.

In such embodiments, the total number of relay nodes for a given eNodeB (or for a given cell) may include multiple relay nodes that each have their own separate relay backhaul link to the same donor eNodeB (or in the same cell). Additionally or alternatively, the total number of relay nodes may include multiple cascaded relay nodes, which share the same relay backhaul link to a donor eNodeB. For example, a first relay node may connect via a second relay node to a donor eNodeB. In this scenario, the total number of relay nodes for the eNodeB (or the cell in which the relay backhaul link from the second relay node is established) may be two, even though the first and second relay nodes share a relay backhaul link. Of course, the total number may increase according to the number of cascaded relay nodes.

C. Cooperating Set Selection Process for a Given UE

In some embodiments, donor status may be considered as part of the process of determining the CoMP cooperating set for a given UE. As such, when multiple cells are being considered for a UE's cooperating set, the donor status of the eNodeB or eNodeBs serving these cells be taken into consideration.

Figure 4A:
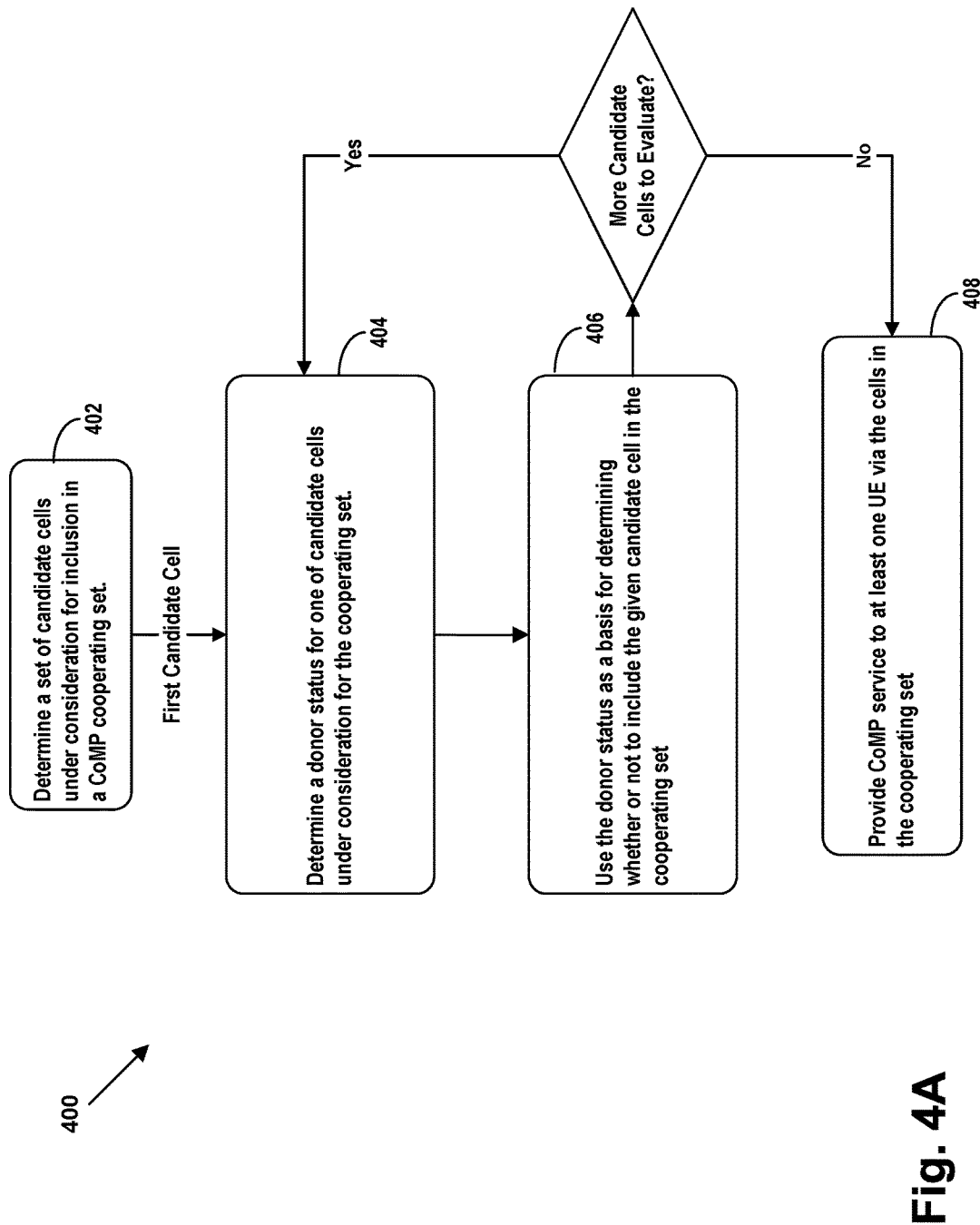
FIG. 4A shows a method for determining the cooperating set for a user equipment, according to example embodiments.

For example, FIG. 4A shows a method for determining the cooperating set for a UE, according to an example embodiment. FIG. 4A may be implemented by the eNodeB for the UE's serving cell (e.g., by the serving eNodeB), or by another network entity, in order to establish and/or update the CoMP cooperating set for the UE. To do so, the serving eNodeB or another network entity may determine the donor status of, and possibly other information related to, a set of cells that are under consideration for the cooperating set. This information may be used to implement a preference to include cells served by non-donor eNodeBs and/or served by donor eNodeBs serving a lesser number of relay eNodeBs in the CoMP cooperating set.

More specifically, at block 402, method 400 involves an eNodeB determining a set of candidate cells under consideration for inclusion in a CoMP cooperating set. In exemplary embodiments, the serving eNodeB may identify or determine the reporting set for the UE at block 402 (which may be sent to the eNodeB by the UE). In some implementations, the serving eNodeB may identify the entire reporting set as the candidate cells at block 402. In other implementations of block 402, the serving eNodeB may include a subset of the reporting set in the set of candidate cells. In other embodiments, the candidate cells may include the cells from a UE's measurement set, or a subset thereof. Of course, the initial group of cells to be considered for the CoMP cooperating set may be determined in other ways, without departing from the scope of the invention.

At block 404, the eNodeB determines a donor status for a first candidate cell under consideration for the cooperating set. The donor status may be determined in the same or a similar manner as described in reference to block 302 of method 300. At block 406, the serving eNodeB uses the donor status as a basis for determining whether or not to include the first candidate cell in the cooperating set. As further shown in FIG. 4A, serving eNodeB may then repeat blocks 404 and 406 for one or more of identified candidate cells in order to determine which of the candidate cells to include in the CoMP cooperating set.

In some embodiments, the serving eNodeB may perform blocks 404 and 406 for each candidate cell, such that the donor status of the eNodeB that serves each candidate cell is taken into account for all candidate cells. As such, the serving eNodeB may consider the donor status and/or other information for each candidate cell (e.g., channel state information reported by the UE).

For example, at block 406, the serving eNodeB may consider whether each candidate cell is served by a donor eNodeB and either (i) omit the candidate cell from the cooperating set if the candidate cell is served by a donor eNodeB, or (ii) if the candidate cell is not served by a donor eNodeB, continue to consider whether to include the candidate cell based on other information, such as reported channel state information (e.g., CRS or CSI-based measurements reported by the UE in the RSRP or RSRQ).

As another example, each time block 406 is performed for a candidate cell that is served by a donor eNodeB, the serving eNodeB may first determine whether or not the candidate cell itself supports a relay backhaul link or links (e.g., whether the status of the eNodeB as a donor is due to the existence of relay backhaul link(s) in the candidate cell, or only due to the existence of relay backhaul link(s) in other cells served by the same eNodeB). If there are no relay backhaul links established via the candidate cell, then the serving eNodeB may treat the candidate cell as if it were served by a non-donor eNodeB (e.g., by determining whether to include the candidate cell channel measurements for the candidate cell that were reported by the UE).

Alternatively, the donor eNodeB may apply a weighting that makes it less likely that a candidate cell that is served by a donor eNodeB, but does not itself support the relay backhaul links, will be included in the cooperating set (e.g., by requiring higher value(s) for a candidate cell's reported channel state information), as compared to when the candidate cell is served by a non-donor eNodeB. Further, the applied weighting may be such that even higher value(s) for reported channel state information are required in order to include a candidate cell that supports a relay backhaul link in the CoMP cooperating set, as compared to a candidate cell that is served by a donor eNodeB, but does not itself support a relay backhaul link.

Other examples where the serving eNodeB considers the donor status corresponding to all candidate cells are also possible In some embodiments, the serving eNodeB may only perform block 404 for a subset of the candidate cells. For example, in a scenario where the eNodeB carrying out method 300 and the first base station are one and the same, and this eNodeB also operates a UE's serving cell, the serving cell may be automatically included in the cooperating set, such that it is unnecessary to perform block 404 for the serving cell. Additionally or alternatively, when method 400 is performed by a serving eNodeB, the eNodeB may elect not to consider donor status for any cell it serves. In other words, block 404 may only be performed for cells from the reporting set that are served by a different eNodeB. As such, the serving eNodeB may determine whether to include each candidate cell served by another eNodeB based on the candidate cell's donor status and channel state information (e.g., by performing block 406), and determine whether to include each candidate cell it serves based on the channel state information alone.

In method 400, the serving eNodeB considers candidate cells one at a time, when deciding which cells to include in the cooperating set. In other embodiments, the serving eNodeB may first determine donor status, channel state information, and/or other information for all the candidate cells (or perhaps a subset of the candidate cells), and then perform comparative analysis to determine which cells to include in the CoMP cooperating set.

Figure 4B:
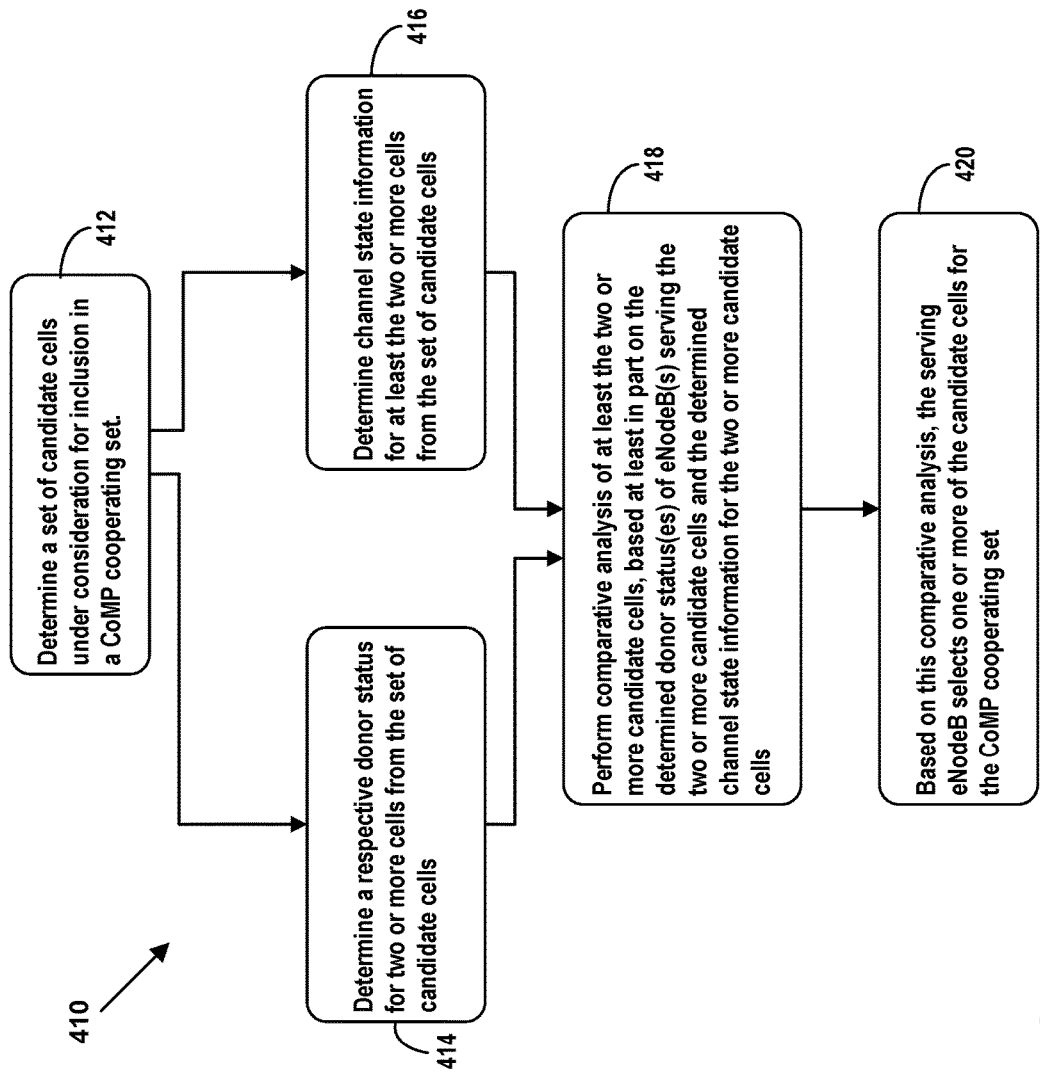
FIG. 4B shows a method for determining the cooperating set for a user equipment, according to example embodiments.

FIG. 4B is flow chart illustrating another method 410, according to an exemplary embodiment. Method 410 involves comparative analysis of donor status and reported channel state information between multiple candidate cells, in order to determine which cells to include in the CoMP cooperating set.

In particular, block 412 involves an eNodeB determining a set of candidate cells under consideration for inclusion in a CoMP cooperating set. In exemplary embodiments, the serving eNodeB may identify or determine the reporting set for the UE at block 412. In some implementations, the serving eNodeB may identify the entire reporting set or the entire measurement set as the candidate cells at block 412. In other implementations of block 412, the serving eNodeB may include a subset of the reporting set or a subset of the measurement set as the set of candidate cells. Of course, the initial group of cells to be considered for the CoMP cooperating set may be determined in other ways, without departing from the scope of the invention.

At block 414, the eNodeB determines a respective donor status for two or more cells from the set of candidate cells. The donor status for each cell may be determined in the same or a similar manner as described in reference to block 302 of method 300. Further, at block 416, the serving eNodeB determines channel state information for the candidate cells. At block 418, the serving eNodeB then performs a comparative analysis of the candidate cells, based at least in part on the determined donor status(es) of eNodeB(s) serving the candidate cells and the determined channel state information for the candidate cells. Based on this comparative analysis, the serving eNodeB selects one or more of the candidate cells for the CoMP cooperating set, as shown by block 420.

In some embodiments, the determined donor status may indicate a number of relay nodes served by a given eNodeB. In such embodiments, the comparative analysis at block 418 may involve a prioritization of candidate cells served by eNodeBs serving as donor for a lower number (or zero) relay nodes, and/or a prioritization of candidate cells in which a lower number (or zero) relay nodes are supported. For example, the serving eNodeB may rank the candidate cells according to the number of relay nodes supported by their respective eNodeBs and/or the respective number of relay backhaul links established in each candidate cell. As such, block 420 may involve the serving eNodeB selecting a certain number or percentage of the highest-ranking candidate cells (e.g., based on channel state information) to include in the CoMP cooperating set.

In other implementations, block 418 may involve the serving eNodeB determining a ranking or a comparable value for each candidate cell by weighting each cell's measurements of channel state (e.g., as reported by the UE in RSRP/RSRQ report) according to the number of relay nodes served by the eNodeB for the cell and/or the number relay backhaul links established in the cell. In such implementations, greater weight will generally being placed on cells served by eNodeBs supporting less (or zero) relay nodes and/or having less (or zero) backhaul relay links.

In embodiments where the eNodeB determines weights channel state information according to donor status, block 420 may involve the serving eNodeB selecting a certain number or percentage of the candidate cells having the highest weighted channel state measurements to include in the CoMP cooperating set. Alternatively, block 420 could involve the serving eNodeB selecting candidate cells for which the respective weighted channel state measurements are each greater than a predetermined threshold for inclusion in the CoMP cooperating set. In such embodiments, if the cooperating set is limited to some pre-determined maximum size, and the number of candidate cells with a weighted channel state measurement meeting the threshold requirement is greater than the maximum size, then the eNodeB may exclude one or more candidate cells from the group that meet the threshold requirement, in order to limit the CoMP cooperating set to the predetermined maximum size. To do so, the serving eNodeB may select a subset of candidate cells having the highest weighted channel state measurements from the group of candidate cells that meet the threshold requirement.

IV. CONCLUSION

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

The invention claimed is:

1. A method comprising:
   determining a donor status of a first base station that serves a first cell, wherein the donor status indicates whether or not the first base station is configured as a donor base station for at least one relay node; and
   based at least in part on the determined donor status of the first base station, determining whether or not to include the first cell in a coordinated multipoint (CoMP) cooperating set, wherein at least one UE is provided CoMP service by the CoMP cooperating set,
   wherein, when the determined donor status indicates that the first base station is configured as a donor base station for at least one relay node, determining whether or not to include the first cell served in the CoMP cooperating set comprises omitting or removing the first cell from a CoMP measurement set.

2. The method of claim 1, wherein the CoMP measurement set is sent to at least one UE and indicates cells for which channel state information is requested from the UE to facilitate selection of the CoMP cooperating set.

3. The method of claim 1, further comprising omitting or removing any cell served by the first base station from the CoMP measurement set.

4. The method of claim 1, further comprising:
receiving a reporting set from a UE, wherein the reporting set comprises channel state information for one or more cells comprising at least the first cell, and wherein the reporting set is used as a basis for selecting the CoMP coordinating set;
wherein the determined donor status indicates that the first base station is configured as a donor base station for at least one relay node; and
wherein determining whether or not to include the first cell in the CoMP cooperating set comprises, responsive to the determination that the donor status indicates the first base station is configured as a donor base station, removing the first cell from the reporting set.

5. The method of claim 1, wherein determining whether or not to include the first base station in the cooperating set comprises:
if the determined donor status indicates the first base station is operating as a donor base station, then refraining from including the first base station in the cooperating set; and
if the determined donor status indicates the first base station is not operating as a donor base station, then including the first base station in the cooperating set.

6. The method of claim 1, wherein determining whether or not to include the first base station in the cooperating set comprises:
if the determined donor status indicates the first base station is operating as a donor base station, then refraining from including the first base station in the cooperating set; and
if the determined donor status indicates the first base station is not operating as a donor base station, then using one or more other factors as a basis for determining whether or not to include the first base station in the cooperating set.

7. A method comprising:
determining a set of candidate cells under consideration for inclusion in a coordinated multipoint (CoMP) cooperating set;
for each of one or more of the candidate cells, determining a donor status for a base station serving the candidate cell, wherein the donor status indicates whether or not the base station is configured as a donor base station for at least one relay node; and
using each determined donor status as a basis for determining whether to include the corresponding candidate cell in the CoMP cooperating set, wherein, when the determined donor status indicates that the corresponding base station is configured as a donor base station for at least one relay node, the corresponding candidate cell is not included in the CoMP cooperating set.

8. The method of claim 7, wherein determining the donor status for each of each of the one or more of the candidate cells comprises determining a respective number of relay nodes for which the base station serving the candidate cell also serves as a donor base station.

9. The method of claim 7, wherein determining the donor status for each of each of the one or more of the candidate cells comprises determining a total number of relay backhaul links via the candidate cell to the base station serving the candidate cell.

10. The method of claim 7, further comprising, receiving a CoMP reporting set from a user equipment (UE), wherein the CoMP reporting set comprises a plurality of cells, and wherein the set of candidate cells comprises the CoMP reporting set or a subset thereof.

11. The method of claim 10, wherein a determination is made that a first cell from reporting set is served by a base station configured as a donor base station for one or more relay nodes, and wherein using the respectively determined donor status for the one or more of the candidate cells as a basis for selecting one or more of the cells to include in the CoMP cooperating set comprises removing the first cell from the reporting set, such that the first cell is not included in the CoMP cooperating set.

12. The method of claim 7, further comprising, determining a CoMP measurement set for a user equipment (UE), wherein the CoMP measurement set comprises a plurality of cells, and wherein the set of candidate cells comprises the CoMP measurement set or a subset thereof.

13. The method of claim 12, wherein a determination is made that a first cell from the CoMP measurement set is served by a base station configured as a donor base station for one or more relay nodes, and wherein using the respectively determined donor status for the one or more of the candidate cells as a basis for selecting one or more of the cells to include in the CoMP cooperating set comprises removing the first cell from the CoMP measurement set, such that the first cell is not included in the CoMP cooperating set.

14. The method of claim 7, wherein determining the donor status for each of one or more of the candidate cells and using the respectively determined donor status for the one or more of the candidate cells as a basis for determining one or more candidate cells to include in the CoMP cooperating set comprises:
for each of one or more of the candidate cells:
(i) determining a donor status for the candidate cell; and
(ii) using the determined donor status as a basis for determining whether or not to include the candidate cell in the cooperating set.

15. The method of claim 14, further comprising using channel state information for each of the one or more of the candidate cells as a further basis for determining whether or not to include the candidate cell in the cooperating set.

16. The method of claim 7, wherein a respective donor status is determined for each two or more of the candidate cells, the method further comprising:
determining channel state information for each of the two or more of the candidate cells;
comparing the two or more candidate cells based on the respectively determined channel state information and the respectively determined donor status; and
wherein the determination of which candidate cells to include in the CoMP cooperating set is based at least in part on the comparison of the two more candidate cells.

17. A method comprising:
determining a set of candidate cells under consideration for inclusion in a coordinated multipoint (CoMP) cooperating set;
for each of one or more of the candidate cells, determining a donor status corresponding to the candidate cell, wherein the donor status indicates whether or not a relay backhaul link is established via the candidate cell; and
using the one or more determined donor statuses for the one or more of the candidate cells as a basis for determining one or more of the candidate cells to include in the CoMP cooperating set, wherein, when the determined donor status indicates for a given one of the candidate cells indicates that a relay backhaul link is established via the candidate cell, the given candidate cell is not included in the CoMP cooperating set.

18. The method of claim 17, wherein determining the donor status corresponding to a given one of the candidate cells comprises determining a total number of relay backhaul links established via the given candidate cell.

19. The method of claim 17, wherein determining the donor status corresponding to a given one of the candidate cells comprises determining whether a base station that serves the given candidate cell is configured as a donor base station for at least one relay node.

20. The method of claim 17, wherein the method is implemented by an eNodeB in an LTE network.

\* \* \* \* \*